US005847306A

United States Patent [19]

Wakuda

[11] Patent Number: 5,847,306

[45] Date of Patent: Dec. 8, 1998

[54] ELECTRONIC MUSICAL INSTRUMENT WITH AUTOMATIC AND SEMI-AUTOMATIC PLAYING APPARATUS

[75] Inventor: Sadamoto Wakuda, Shizuoka, Japan

[73] Assignee: Kawai Musical Instruments Manufacturing Co., Ltd., Hamamatsu, Japan

[21] Appl. No.: 892,362

[22] Filed: Jul. 14, 1997

[30] Foreign Application Priority Data

Jul. 15, 1996 [JP] Japan .................................... 8-204283
Jul. 15, 1996 [JP] Japan .................................... 8-204284

[51] Int. Cl.$^{6}$ .............................. G01B 15/04; G10H 1/36

[52] U.S. Cl. .................................. 84/649; 84/652; 84/478

[58] Field of Search ..................... 84/609–614, 634–638, 84/649–652, 666–669, 712–717, DIG. 12, DIG. 22, 477 R, 478

[56] References Cited

U.S. PATENT DOCUMENTS 4,926,738 5/1990 Kondo et al. ...................... 84/DIG. 12

*Primary Examiner*—Stanley J. Witkowski
*Attorney, Agent, or Firm*—Christie, Parker & Hale, LLP

[57] ABSTRACT

When the action of key depression is paused in a semi-automatic play mode, the semi-automatic playing is switched to automatic playing. When the key depression is made in the automatic playing, the playing is shifted back to the semi-automatic playing. An electronic musical instrument includes a semi-automatic play timing controlling means responsive to a key-depression by a player for controlling the first timing for tone generation, and an automatic play timing controlling means responsive to a timing information contained in a musical playing data for controlling the second timing for tone generation. The automatic playing is enabled when the key depression is not detected within a predetermined duration of time in the semi-automatic playing with the first timing controlled by the semi-automatic play timing controlling means. In the semi-automatic playing, the key depression timing may be displayed at the second timing controlled by the automatic play timing controlling means for ease of the key depression by the player.

19 Claims, 8 Drawing Sheets

ELECTRONIC MUSICAL INSTRUMENT WITH AUTOMATIC AND SEMI-AUTOMATIC PLAYING APPARATUS

BACKGROUND OF THE INVENTION

1. Field of the Invention

The present invention relates to an electronic musical instrument equipped with a full-automatic and a semi-automatic playing apparatus and particularly, an electronic musical instrument equipped with an automatic/semi-automatic playing switching apparatus which selects between full-automatic play function and semi-automatic play function subjected to the timing for tone generation given manually as well as an electronic musical instrument capable of displaying the timing of key depression for the semi-automatic playing according to a full-automatic play function.

2. Description of the Related Art

Conventional electronic musical instrument such as an electronic piano or a synthesizer is equipped with a full-automatic playing apparatus which produces musical tone signals corresponding to the playing data saved in ROMs or entered by a player. Such an automatic playing apparatus performs in a normal mode a full-automatic play while timing the tone generation with a tempo clock generated therein and may be equipped with a semi-automatic playing function for producing, at the timing controlled by key depression, sounds with pitches determined by the playing data.

It is common for the semi-automatic playing function that semi-automatic playing can hardly be carried out when the timing of play or key depression is not known. The semi-automatic playing of a score should be commenced only after the score was previously played in automatic play mode to acknowledge its melody.

If a player has lost the timing for key depression during the playing of the score with the semi-automatic playing function, it may be recovered by switching back to the automatic play mode to replay the score for acknowledgment of its melody and then, returning to the semi-automatic playing to start again. This switching action is troublesome and will take an extra length of time for recalling even such a small part of the score.

SUMMARY OF THE INVENTION

It is a first object of the present invention to provide an electronic musical instrument equipped with a full-automatic/semi-automatic play switching apparatus which automatically switches to an automatic play mode when the action of key depression is paused longer than a predetermined time interval in a semi-automatic play mode and shifts back to the semi-automatic play mode when the key depression is made in the full-automatic play mode, whereby semi-automatic playing can be conducted without knowing a tune to be played.

It is a second object of the present invention to provide an electronic musical instrument for performing semi-automatic playing without knowing a tune to be played by displaying the timing for key depression in the semi-automatic play mode using the full-automatic playing function.

A first feature of the present invention is characterized by a semi-automatic play timing controlling means responsive to the key-depression by a player for controlling the timing for musical tone generation, an automatic play timing controlling means responsive to the timing information contained in a musical playing data for controlling the timing for musical tone generation, a playing pause detecting means for monitoring a key-depression signal and when the key-depression signal is not issued for a predetermined period of time, producing a semi-automatic playing pause signal, a play mode switching means responsive to the semi-automatic playing pause signal produced in the semi-automatic playing for switching from the semi-automatic playing to the automatic playing, and a tone generating means for tone generation according to the pitch information contained in the playing data at the tone generation timing. A second feature of the present invention is that the play mode switching means is responsive to the key depression in the automatic playing after being switched from the semi-automatic playing for switching from the automatic playing to the semi-automatic playing.

When the key depression is paused more than a predetermined length of time in the semi-automatic playing due to, e.g. a lapse of memory, the automatic playing starts as a sample playing from the point where the playing is interrupted. This allows the player to listen and acknowledge the tune or score without conducting any extra operation. When the key depression is made in the automatic sample playing, the playing is automatically changed back to the semi-automatic sample playing. This allows the semi-automatic play mode to be easily recalled by the key depression at any desired point when the tune is regained without difficulty.

A third feature of the present invention is characterized by a semi-automatic play timing controlling means responsive to the key-depression by a player for controlling the timing for tone generation, an automatic play timing controlling means responsive to timing information contained in musical playing data for controlling the timing for tone generation, a key depression timing displaying means for generating a stimulus such as visual, audible indication and/or vibration indicative of the timing for key depression at the tone generation timing controlled by the automatic play timing controlling means in the semi-automatic playing, and a tone generating means for producing musical sound according to a pitch information contained in the musical playing data at the tone generation timing.

The semi-automatic playing of a new, unknown tune may be easily played with simple key operation though following the key depression display with using a visual, audible display and/or touch sense.

DETAILED DESCRIPTION OF THE PREFERRED EMBODIMENT

Figure 1:
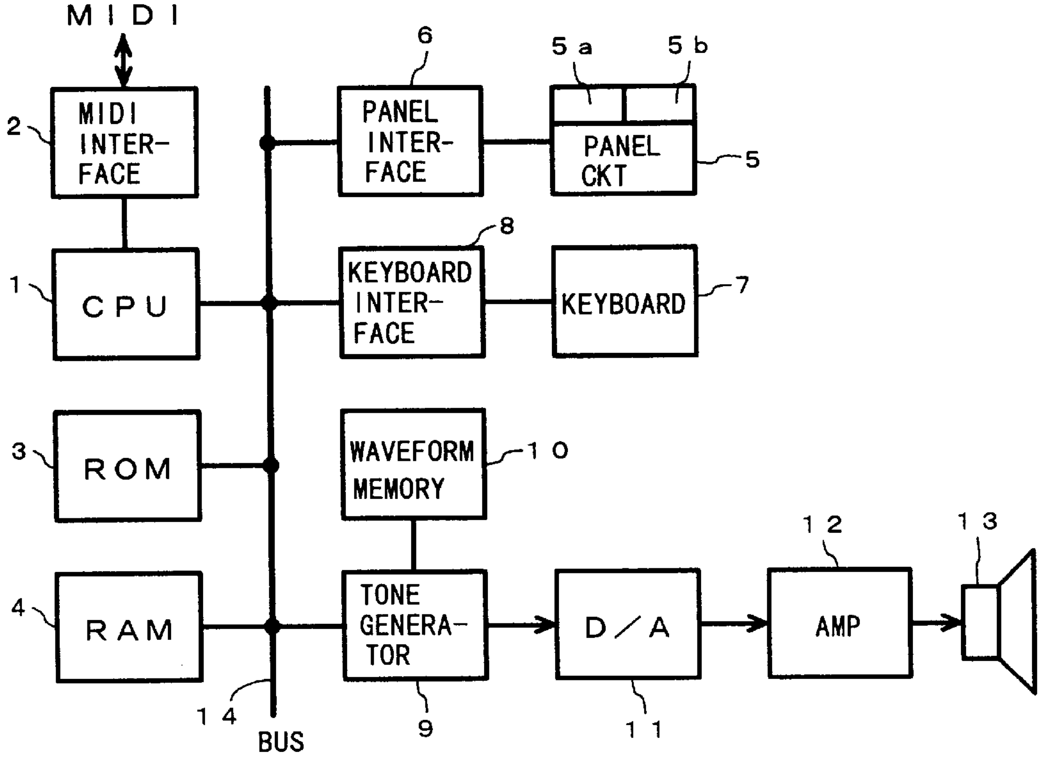
FIG. 1 is a block diagram of a circuitry arrangement of an electronic piano according to the present invention.

The preferred embodiments of the present invention will now be described with reference to the accompanying drawings. FIG. 1 is a block diagram illustrating an electronic piano according to the present invention. A CPU 1 controls the entire electronic piano in consonance with a control program stored in a ROM 3. The CPU 1 has serial and/or parallel port for connection with a timer interrupt circuit and a MIDI interface circuit 2. The MIDI interface circuit 2 is an electronic circuit for exchanging a MIDI message with an external MIDI device.

A control program, a timbre parameter, performance data for an automatic play, etc., are stored in the ROM 3. The timbre parameter includes waveform address data and envelope control data stored in a waveform memory 10. A RAM 4 is used as a work area and as a buffer, and may be backed up by a battery. A panel circuit 5 includes various switches 5*a* for selection of automatic or semi-automatic play mode, and timbre selection, etc., a display device 5*b* for displaying characters by using a liquid crystal or an LED, and being connected with a bus 14 through their interface circuit 6. A keyboard 7 has a plurality of keys, each of which is provided with two switches for detecting its depression, for example. A keyboard interface circuit 8 scans the switch states of the individual keys, detects changes in the states, and generates key event (key ON or key OFF) data and touch (velocity) data.

A tone generator 9 is a circuit to generate a desired musical tone signal in a waveform reading method. For example, from a waveform memory 10 in which are stored digital musical tone waveform sampling values, waveform data is sequentially read out at an address interval that is proportional to a pitch to be produced. Interpolation calculation on the data read out is performed and a tone waveform signal is generated. The tone generator 9 has an envelope generator, too. An envelope signal that is produced based on a predetermined envelope parameter is multiplied by a waveform tone signal, and a musical tone signal is outputted. Although the tone generator 9 has a plurality (e.g., 32) of tone generation channels, practically, a single tone generator circuit is multiplexed in a time sharing manner, so that a plurality of musical tone signals can be independently generated at the same time.

A D/A converter 11 converts a digital tone signal into an analog signal, and outputs it to an amplifier 12. The tone signal is amplified by the amplifier 12 and released through a loudspeaker 13 as the musical tone. A bus 14 interconnects the individual circuits in the electronic piano. As needed, a memory card interface circuit and/or a floppy disk may be provided.

Figure 2:
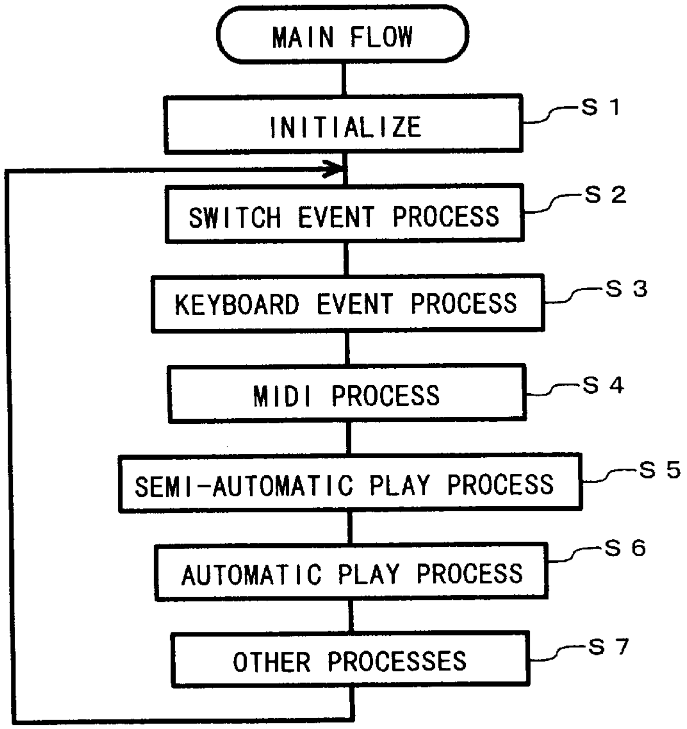
FIG. 2 is a flowchart showing a procedure of the main process in CPU 1 shown in FIG. 1.

FIG. 2 is a flowchart showing the main process for the CPU 1. At step S1, the RAM 4 and the tone generator 9 are initialized. At step S2, the state of the switches on the panel circuit 5 is examined to determine whether it has changed. When a change in the switch state is detected, a predetermined process corresponding to the state change is performed.

At step S3, a check is performed to determine whether or not an occurrence of a key event has been received from the keyboard interface circuit 8, i.e., whether the switch states of the individual keys have changed. When the result is affirmative, a well-known key event process is performed.

At step S4, a check is performed to determine whether or not a MIDI message is stored in a receiver buffer of the RAM 4. When a message signal is stored, a tone generation process is performed in the same manner as is the process for the occurrence of a key event. The storing of the received MIDI message into the buffer is executed in an interrupt process caused by reception of the MIDI signal. At steps S5 and S6, a semi-automatic playing and an automatic playing processes are performed, respectively, as described later in detail. At step S7, other necessary processes including an effect provision process are executed.

Figure 3:
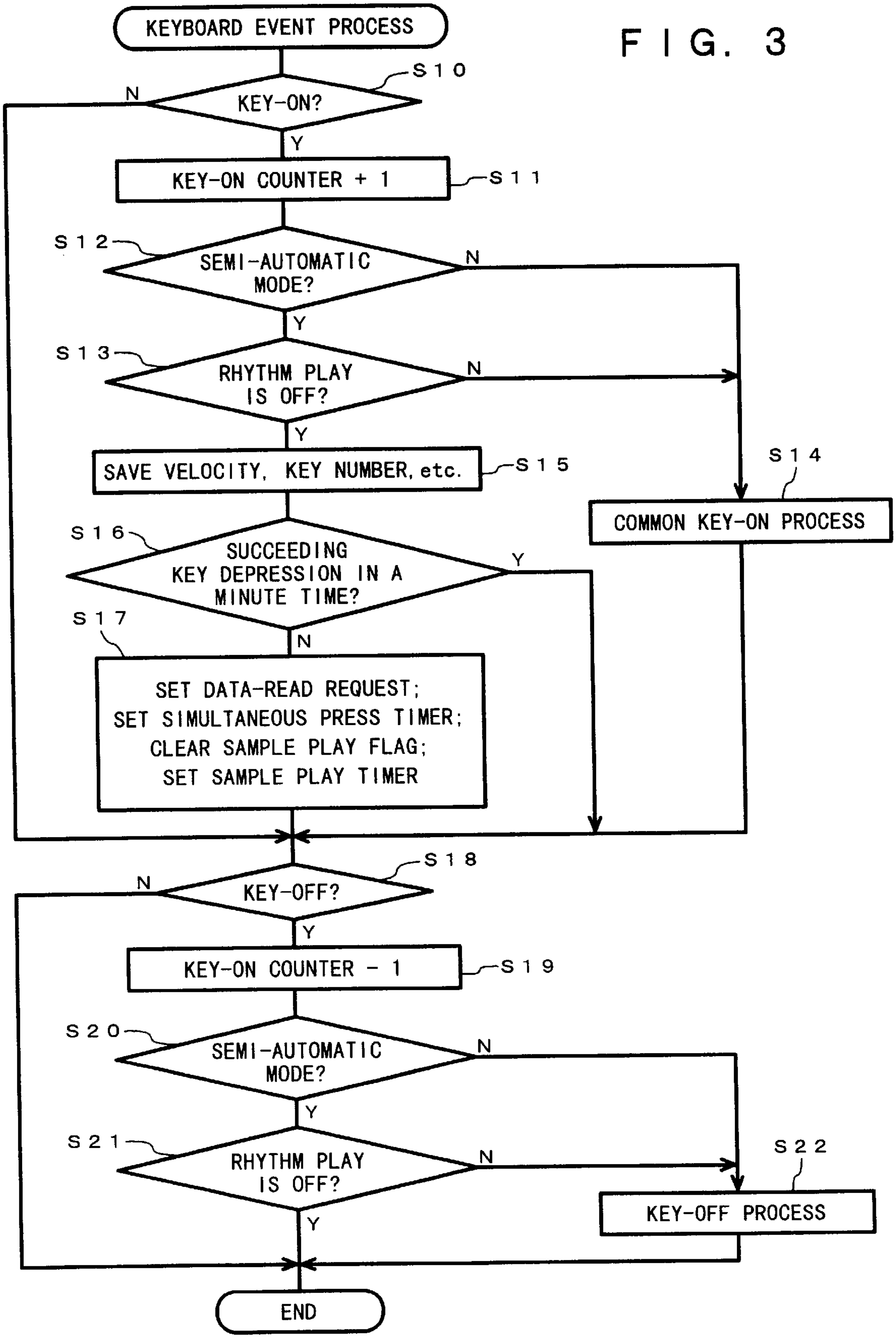
FIG. 3 is a flowchart showing a procedure of processing keyboard events in the first embodiment according to the present invention.

FIG. 3 is a flowchart showing a procedure of processing keyboard events at Step S3 in FIG. 2. At Step S10, it is examined whether key-on is issued or not. When yes, the procedure goes to Step S11 where the key-on counter for counting the number of keys in the key-on mode is increased by one. It is then examined at Step S12, based on the switching action in the panel circuit 5, whether the semi-automatic play mode is selected on or not. If not, the procedure moves to Step S14, while when yes, it advances to Step S13.

At Step S13, it is examined, based on the switching action in the panel circuit 5, whether rhythm play is turned off or not. In the semi-automatic play mode, the rhythm play can be turned on or off by switching action of a player. When the rhythm play is off, the process for the semi-automatic play is carried out. If the rhythm play is on, the same playing procedure as in the full-automatic play mode is performed as a sample play of a piece. The electronic musical instrument of the present embodiment is assumed having an on/off control of the rhythm play but is not limited as such. It may be selected between the semi-automatic play mode and the sample play mode by only switching on or off the semi-automatic play mode.

When it is judged negative at Step S13, the procedure goes to Step S14, while if it is affirmative, to Step S15. At Step S14, common operations for the full-automatic playing including the key-on or other known process for key assignment and a tone control are carried out.

At Step S15, velocity information for the semi-automatic play is saved in a given area of the RAM 4. The velocity information is entered as a touch data during the key depression by the player for the semi-automatic playing and used for envelope control. The key number is not needed for the semi-automatic playing, but may be saved for use entry of chords with the keys of the keyboard grouped into chord sets.

At Step S16, it is examined whether or not the simultaneous press timer is operating a time counting which disables all of succeeding key depressions when a single key or more than two different keys are erroneously depressed within a minute length of time considered as being simultaneous, i.e. determining whether or not the key depression in question is the first one in a predetermined limited minute time. In general, it is first judged not and the procedure moves to Step S17.

At Step S17, steps are followed for setting a data reading request corresponding to the key depression, starting the simultaneous press timer, clearing a sample play flag used for judging whether the automatic playing is recalled or not, and setting a sample play timer for detecting the timing for setting the sample play flag. Meanwhile, any of the succeeding key depressions implemented before time up of the simultaneous press timer is neglected.

At Step S18, it is examined whether or not the keyboard event is a key-off action. When yes, the procedure advances to Step S19 for subtracting one from the count of the key-on counter. It is examined at Step S20 whether the semi-automatic play mode is selected or not. If not, the procedure goes to Step S22, while when yes, to Step S21. At Step S21, it is determined whether the rhythm play is turned off or not. If not, the procedure moves to Step S22 for key-off process. When yes, the procedure is terminated. Each musical tone data in the play information includes a timing data for the key-on and a time (gate-off time) data up to the key-off. The duration from the key-on to the key-off is measured by a timer set with the gate-off time and upon the duration ended, the key-off is executed.

Figure 4:
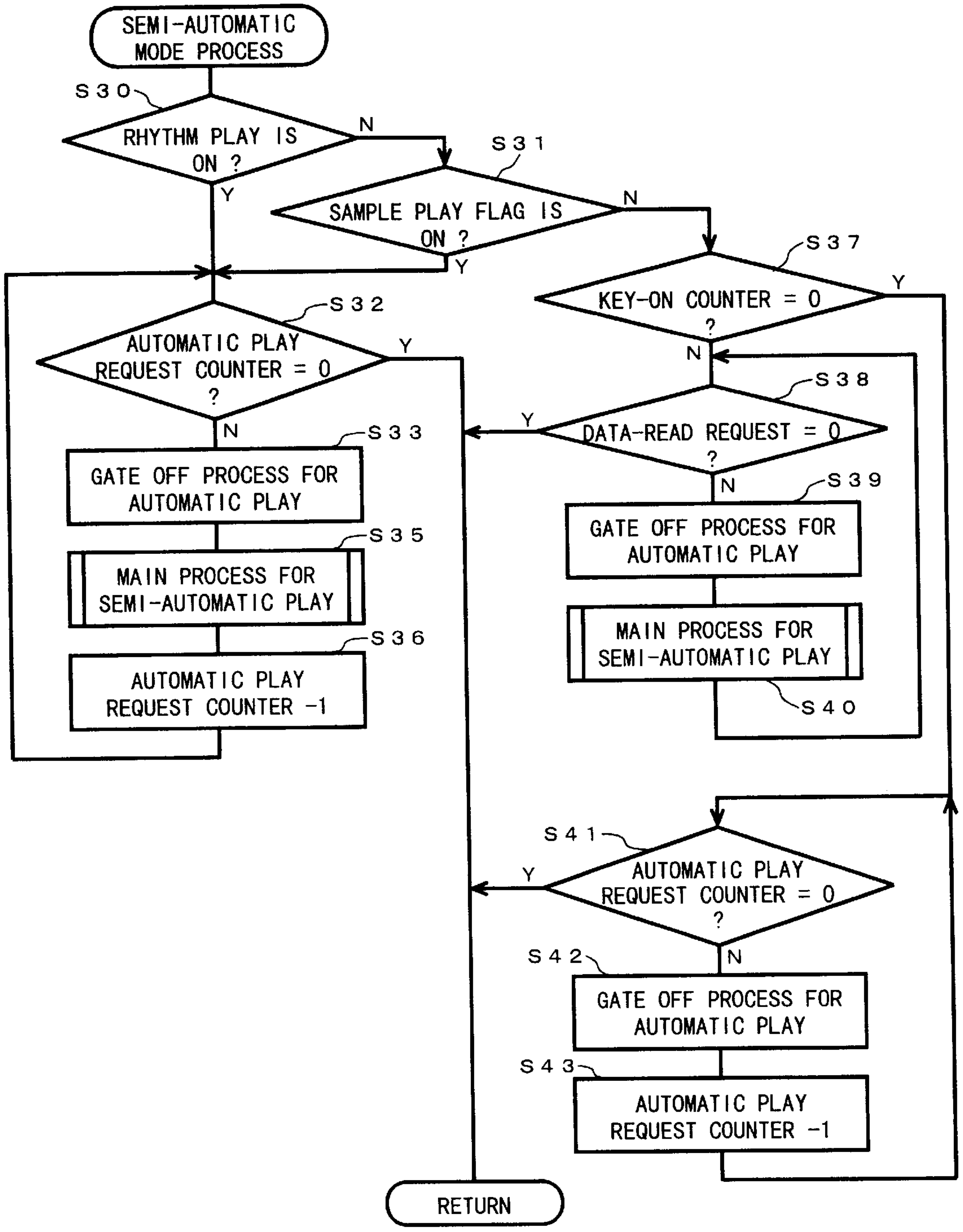
FIG. 4 is a flowchart showing a procedure in a semi-automatic mode in the first embodiment according to the present invention.

FIG. 4 is a flowchart showing a semi-automatic mode process at Step S4 in FIG. 2. At Step S30, it is determined whether the rhythm play is turned on or not. When yes, the procedure goes to Step S32 and if not, to Step S31. It is determined at Step S31, based on the sample play flag, whether the sample play is being performed or not. If not, the procedure moves to Step S37 and when yes, to Step S32. Steps S32, S33, S35, and S36 are transition steps to the full-automatic play, which are executed when it is judged that no key depression is made for a predetermined period of time during the semi-automatic playing.

At Step S32, it is determined whether the count of an automatic play request counter is zero or not. The automatic play request counter counts the elapsed time from the preceding automatic playing process and counts up whenever the predetermined period of time K has been elapsed as is triggered by the timer interrupt process which will be explained later. The predetermined time K is set to a length equal to "one step" in the full-automatic playing.

When the count of the automatic play request counter is not zero, the procedure goes to Step S33 where the gate off of the automatic playing is carried out for generating a given length of a musical tone. In the automatic play gate off process, it is checked whether the timer set with the gate (off) time is timed up (to become zero) or not. The gate (off) time is included in the playing information to define a duration time of each musical tone. When the timer is timed up, the key-off process is followed to deaden the musical tone.

At Step S35, a main procedure of the semi-automatic play mode (will be explained later in more detail with reference to FIG. 5) is performed where any musical tone is generated when its timing is matured. This is followed by Step S36 for subtracting "one" from the count of the automatic play request counter in response to addition of "one" on a read timing counter in the main procedure of the semi-automatic play mode as will be explained later. The relation between the automatic play request counter and the read timing counter will also be explained later in more detail. It is judged affirmative at Step S32 when the automatic play request counter is counted down to zero. This sequence of steps are then ended and returned to the main flow.

When it is judged at Step S31 that the sample play flag is not on, i.e., the semi-automatic playing is in action, the procedure goes to Step S37 where it is determined whether the count of the key-on counter is zero or not. If not in Step S37, the procedure moves to Step S38. At Step S38, it is determined whether the data-read request is zero or not. If not, the procedure advances to Step S39 where the automatic play gate off is carried out as identical to Step S33. Then, Step S40 follows where the main procedure of the semi-automatic play mode is performed as equal to Step S35.

In the main procedure of the semi-automatic mode which will be explained referring to FIG. 5, the read timing counter is added by "one" to terminate the procedure when the tone generation timing in the tone generation information does not coincide with the count of the read timing counter corresponding to the number of steps from a bar mark. However, as the tone generation is not carried out according to the given tone information, the data-read request remains uncleared. This allows a repeat of the steps S38 to S39. Only when the timing for tone generation in the tone generation data coincides with the count of the read timing counter, the tone generation information is read out and played before the data-read request is cleared. Two or more of the tone generation processes are executed when a plurality of the tone information is involved at a common tone generation timing as in the case of a chord.

When the key-on counter reads zero at Step S37, the procedure goes to Step S41. It is determined at Step S41 whether the automatic play request counter is zero or not. When not, the procedure moves to Step S42 for carrying out the same automatic play gate off process as of Step S33. At Step S43, the count of the automatic play request counter is subtracted by "one" and the procedure returns to Step S41. Upon the automatic play request counter reaching zero, the semi-automatic mode is terminated and the procedure goes back to the main flow.

Figure 5:
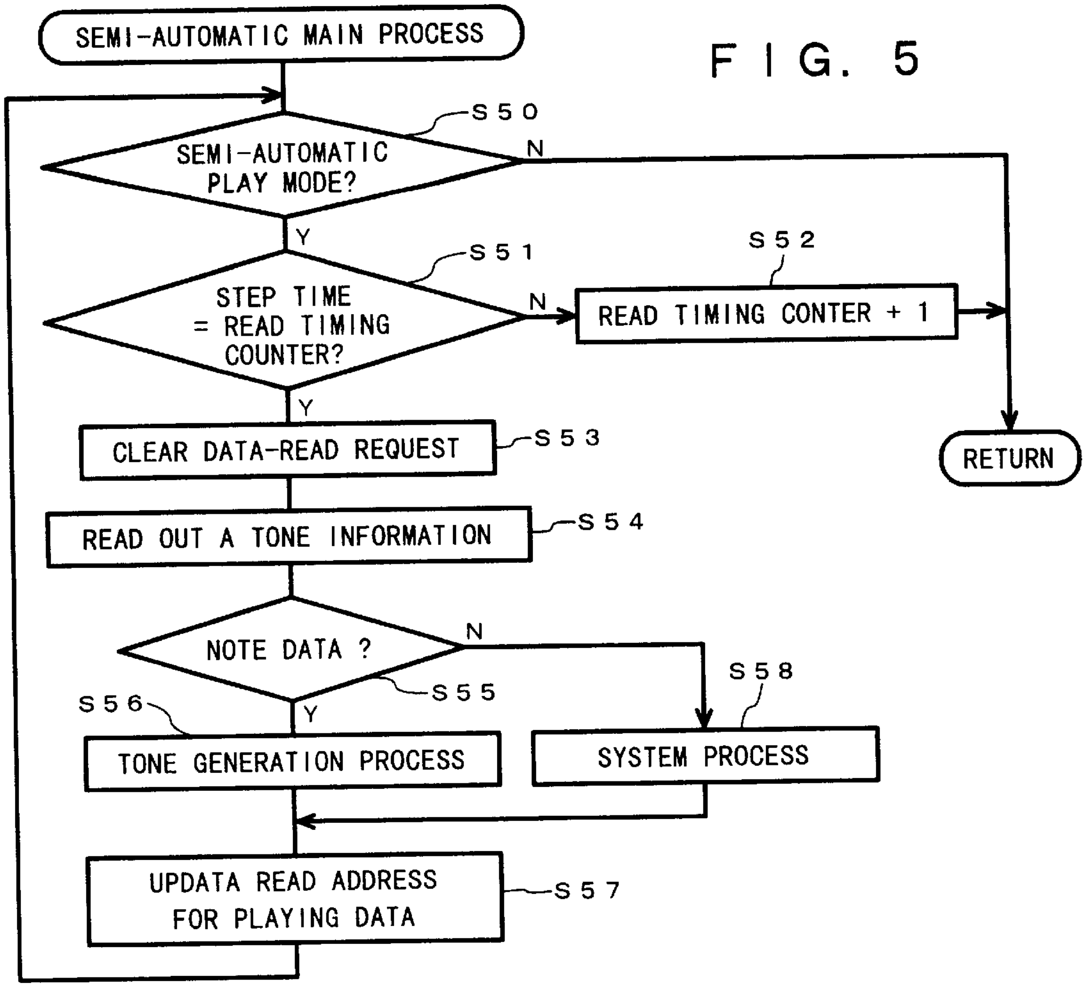
FIG. 5 is a flowchart showing a main process of the semi-automatic mode in the first embodiment according to the present invention.

FIG. 5 is a flowchart showing the main procedure of the semi-automatic play mode. It is determined at Step S50 whether the semi-automatic play mode is selected or not. When yes, the procedure advances to Step S51. At Step S51, it is determined whether or not the count of the read timing counter coincides with a step time in the tone generation information to be the next processed (which is the tone generation timing data in the form of the number of steps corresponding to a duration of time from the bar mark to a current note). When yes, the procedure goes to Step S53 and if not, to Step S52. At Step S52, the read timing counter is added by "one".

In the semi-automatic play mode including Step S37 of FIG. 4, the procedure does not move to Step S53 unless it is judged yes at Step S51 and the data-read request remains uncleared. If Step S38 does not judge yes until the data-read request is cleared, the main procedure of the semi-automatic play mode is repeated. Due to the repetition, adding "one" operation is continued in the read timing counter. As a result, it is judged yes at Step S51 substantially immediately after a note-on (key-on) is detected and the procedure advances to Step S53 for starting the tone generation process.

At Step S53, the data read request is cleared. This is followed by Step S54 where one of the tone information is read out from the playing data. It is determined at Step S55 whether or not the information read out is a note data, i.e., a tone generation command data. When yes, the procedure goes to Step S56 for carrying out the tone generation process. If it is judged at Step S55 that the information read out is not the note data but, for example, a timbre determining data or a bar mark data, the procedure moves to Step S58 where a system process such as parameter modification or read timing counter clearing is executed. In this manner, the read timing counter is cleared at step S58 upon detection of each bar mark, hence indicating a value of count which corresponds to the number of steps after the bar mark. Then, read address for the playing data is updated at Step S57 and the procedure returns to Step S50.

When a currently read playing data is identical in the step time to the preceding playing data, i.e a chord, it is judged yes at Step S51 then Steps S54 to S57 follow. In this manner, the tone information having an identical step time are played in a succession. Such a succession of tones can be perceived as substantially simultaneous sounds by human ears.

An automatic play procedure (Steps S32, S33, S35, and S36) in the semi-automatic play mode shown in FIG. 4 is repeated until the automatic play request counter reaches zero at Step S32. Accordingly, the main procedure of the semi-automatic play mode is carried out as in the semi-automatic playing. The automatic play request counter always reads zero at Step S32 or S41, thus indicating the elapsed time after the preceding semi-automatic play process. By repeating the process for automatic play until the automatic play request counter reaches zero, the read timing counter is continuously counted up. When a tone information of which step time coincides with the count of the read timing counter is introduced, Steps S53 to S57 are enabled for carrying out the tone generation.

Figure 6:
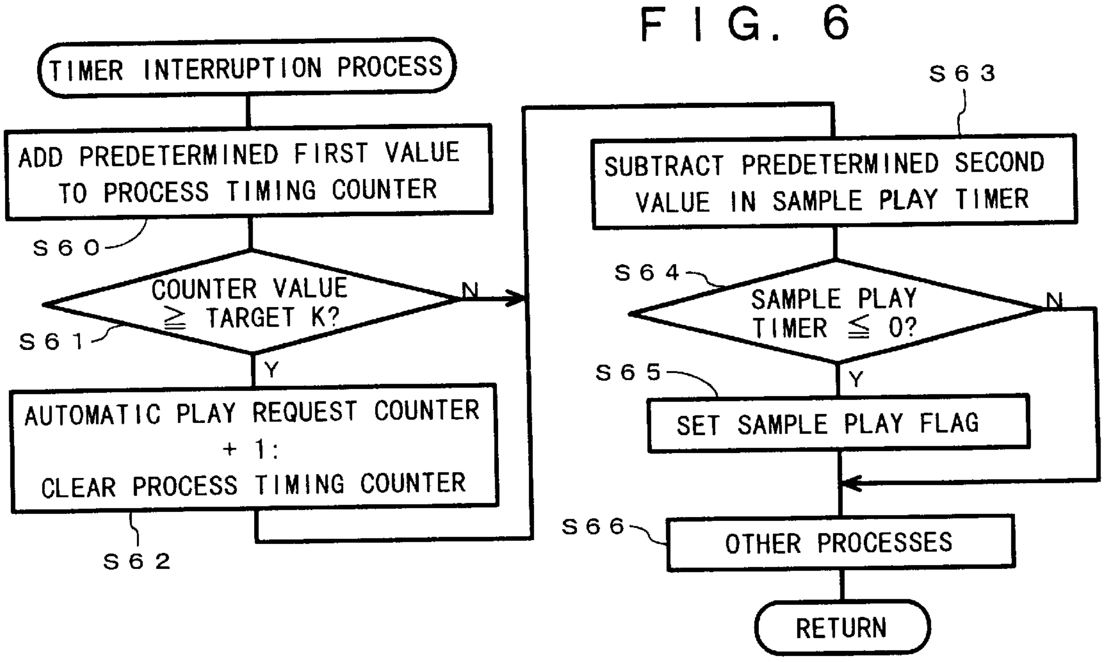
FIG. 6 is a flowchart showing a procedure of timer interruption in the first embodiment according to the present invention.

FIG. 6 is a flowchart showing a timer interruption which is triggered by timer interruption generated periodically by a hardware timer installed in the CPU 1 according to the present embodiment. At Step S60, a process timing counter for measuring an update period of the automatic play request counter is added by a first predetermined value corresponding to the tempo of an automatic playing (which thus increases as the tempo is higher) At Step S61, it is determined whether or not the count of the process timing counter is equal to, or exceeds the predetermined target value K. When yes, the procedure advances to Step S62 where the automatic play request counter is added by one and the process timing counter is cleared.

This is followed by Step S63 for subtracting a second predetermined value from the set value of the sample play timer. The set value of the sample play timer is either positive or negative depending on whether a down-counter or an up-counter is used as a timer means. In this embodiment, the down-counter is employed and the positive value is set. The second predetermined value may be an appropriate value in relation to the sample play timer for starting the sample play after a desired length of time has elapsed since a key depression was paused. At Step S64, it is determined whether the sample play timer reads is equal to or less than zero, or not. When yes, the procedure goes to Step S65 where the sample play flag is turned on or set. Step S66 then follows for performing other processes, for example, updating a software timer.

In brief, in the process in the semi-automatic mode, when each key depression is made within a predetermined time during the semi-automatic playing, the sample play flag is cleared and the sample play timer is set by each key depression (Step S17) and thus it never shifts to the automatic sample playing (Steps S32 to S36) so long as the rhythm play is off, but playing at least one tone information read out by each of the key depressions for music tone generation. If a melody is lost by the player during the semi-automatic playing and the key depression is paused for a predetermined threshold period, the sample play timer counts up to zero (Step S64) and the sample play flag is turned on (Step S65). This triggers a shift from S31 to S32 in the flowchart of FIG. 4 allowing the automatic sample playing from S32 to S36 to be performed according to the playing data after the pause.

When the player resumes the key depression during the automatic sample playing, the sample play flag is cleared (Step S17). Then, the procedure is returned to the semi-automatic playing with the succeeding playing data. As understood, the conditions of the key depression will automatically switch the play mode between the semi-automatic playing and the automatic playing with the player giving no additional commands.

The first embodiment of the present invention may be modified as follows. Although the first embodiment permits the semi-automatic playing mode to shifts to the automatic sample playing when no key depression is made for a predetermined period of time (determined by the sample play timer), such a rather long pause before the succeeding key depression may be produced by, e.g., a whole note or a whole rest. Accordingly, the sample play timer can hardly be set to a very short time in the aforementioned embodiment. A modification may be implemented by setting the sample play timer to a variable time (that is, time to the succeeding key depression according to a score to be played plus a predetermined delay time) rather than only the predetermined time at Step S17 to cause shift to the automatic playing when the key depression is paused over the variable time to the succeeding key depression. In this manner, the automatic playing starts as soon as possible only if the time for the succeeding key depression has been elapsed without effective key depression.

The sample play timer may be determined depending on the skill of the player. Since beginners often delay making the key depression, the sample play timer may be set to a longer period than that for skilled players. For this purpose, two or more settings of the sample play timer are saved in the ROM 3 or RAM 4 for selective use of the player. Also, the settings may be supplied to the RAM 4 with an exclusive message of MIDI format.

In the present embodiment, as the play mode is shifted from the semi-automatic to the sample-automatic, the automatic sample playing is performed with a playing data indicated by a pointer which follows the preceding playing data. If too many keys are depressed by mistake, since the pointer for playing data may be advanced from a point where a melody is lost, the automatic sample playing of the melody may not be properly executed. To compensate, it may be preferable that the automatic sample playing is controlled to start after the pointer for playing data is moved back a distance. Such a distance for moving back the pointer may be fixed or variable to return to the preceding barmark.

Figure 7:
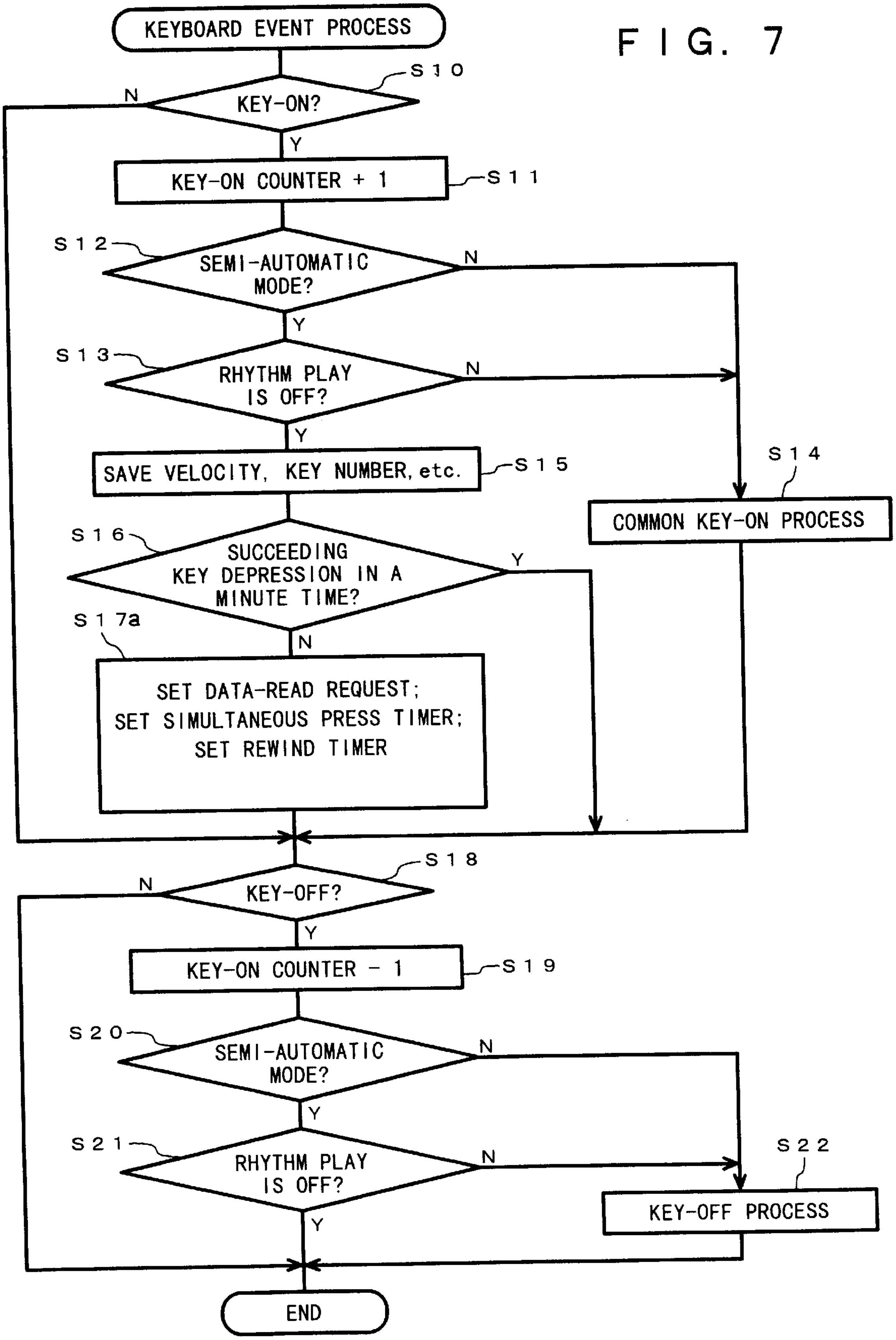
FIG. 7 is a flowchart showing a procedure of processing keyboard events according to the second embodiment.

A second embodiment of the present invention will now be described. The second embodiment includes a main procedure which is identical to that shown in FIG. 2 and will not be explained in more detail. FIG. 7 is a flowchart showing a procedure of processing keyboard events in the second embodiment, which is identical to that shown in FIG. 3 except for Step **S17*a* substituting for S17. At Step S17*a*, a rewind timer is started in place of clearing the sample play flag and starting the sample play timer at Step S17**. If no key depression is detected for a predetermined period set on the rewind timer after the preceding key depression, the read address for playing data is returned to the leading end of the playing data or the front of a tune or score for the automatic or semi-automatic playing. The rewind timer may be set to a desired time and preferably, equal to a setting of the sample play timer in the first embodiment of the present invention.

The automatic playing or sample playing after time up of the rewind timer is executed in almost same way as the first embodiment.

Figure 8:
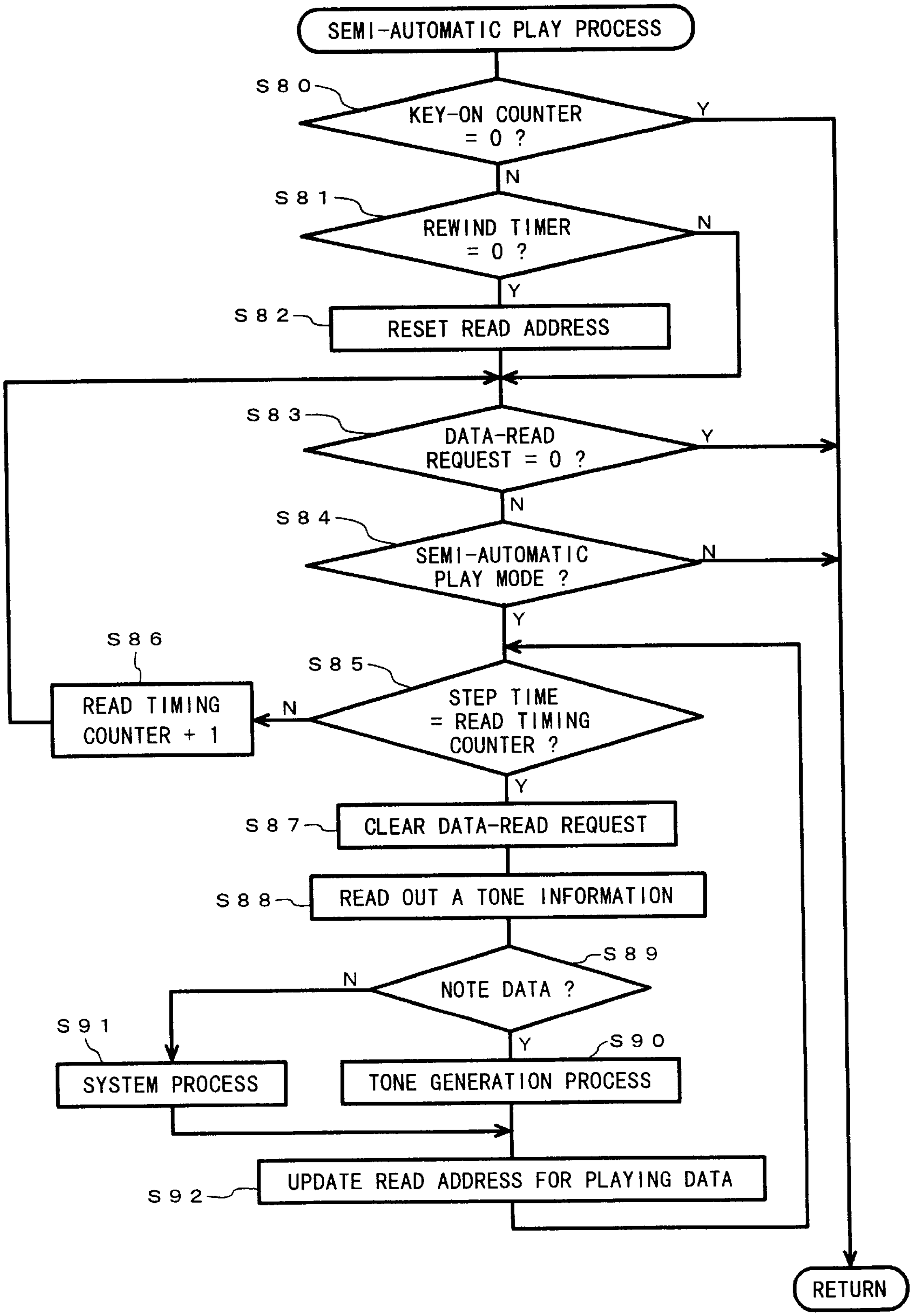
FIG. 8 is a flowchart showing a procedure in a semi-automatic mode of the second embodiment.

FIG. 8 is a flowchart showing a procedure in the semi-automatic mode (S5) of FIG. 2 according to the second embodiment. At Step S80, it is determined whether the key-on counter is zero or not. If not, the procedure moves to Step S81 where it is determined whether or not the rewind timer is zero, i.e., the setting time has been elapsed after the preceding key depression. When yes, it is judged that the semi-automatic playing is canceled by player and the procedure goes to Step S82 where the read address for playing data is reset for returning to the front of the tune.

At Step S83, it is determined from the key depression whether a data read request is zero or not. If not, the procedure advances to Step S84 where it is determined whether the semi-automatic mode is selected or not. When yes, the procedure goes to Step S85 where it is determined whether or not the step time of a tone information to be processed is equal to the count of the read timing counter. When yes, the procedure moves to Step S87 and if not, to Step S86.

At Step S86, the read timing counter is added by "one" and the procedure goes back to Step S83. As the data read request is not cleared before the Step S87 is completed, Steps S83 to S86 are repeated until the step time coincides with the count of the read timing counter.

When it is judged yes at Step S85, the procedure moves to Step S87 where the data read request is cleared. Then, Step S88 follows for reading out tone information from the playing data. At Step S89, it is determined whether the read tone information is a note data or tone generation command data. When yes, the procedure moves to Step S90 for carrying out the tone generation. If not at Step S89 or it is judged that the tone information is not a note data but a command data for e.g. timbre or bar line, the procedure goes to Step S91 where a system process such as parameter change or the read timing counter updating is carried out.

At Step S92, the read address for playing data is updated and the procedure is returned to Step S85. If it is a chord, the step time in the tone information is equal to that of the preceding tone information. Accordingly, the procedure from Step S87 to Step S92 is repeated for carrying out the tone generation. If the tone information is different from the preceding tone information in the step time, the procedure goes via Steps S85 and S86 to Step S83. At the moment, the data read request is cleared and it is hence judged yes at Step S83. This allows the procedure to be terminated.

Although the key-off in the semi-automatic mode according to the second embodiment is not illustrated, it is carried out with a gate-off time which is contained in the tone information together with a timing data for key-on, in the same manner as of the first embodiment.

Figure 9:
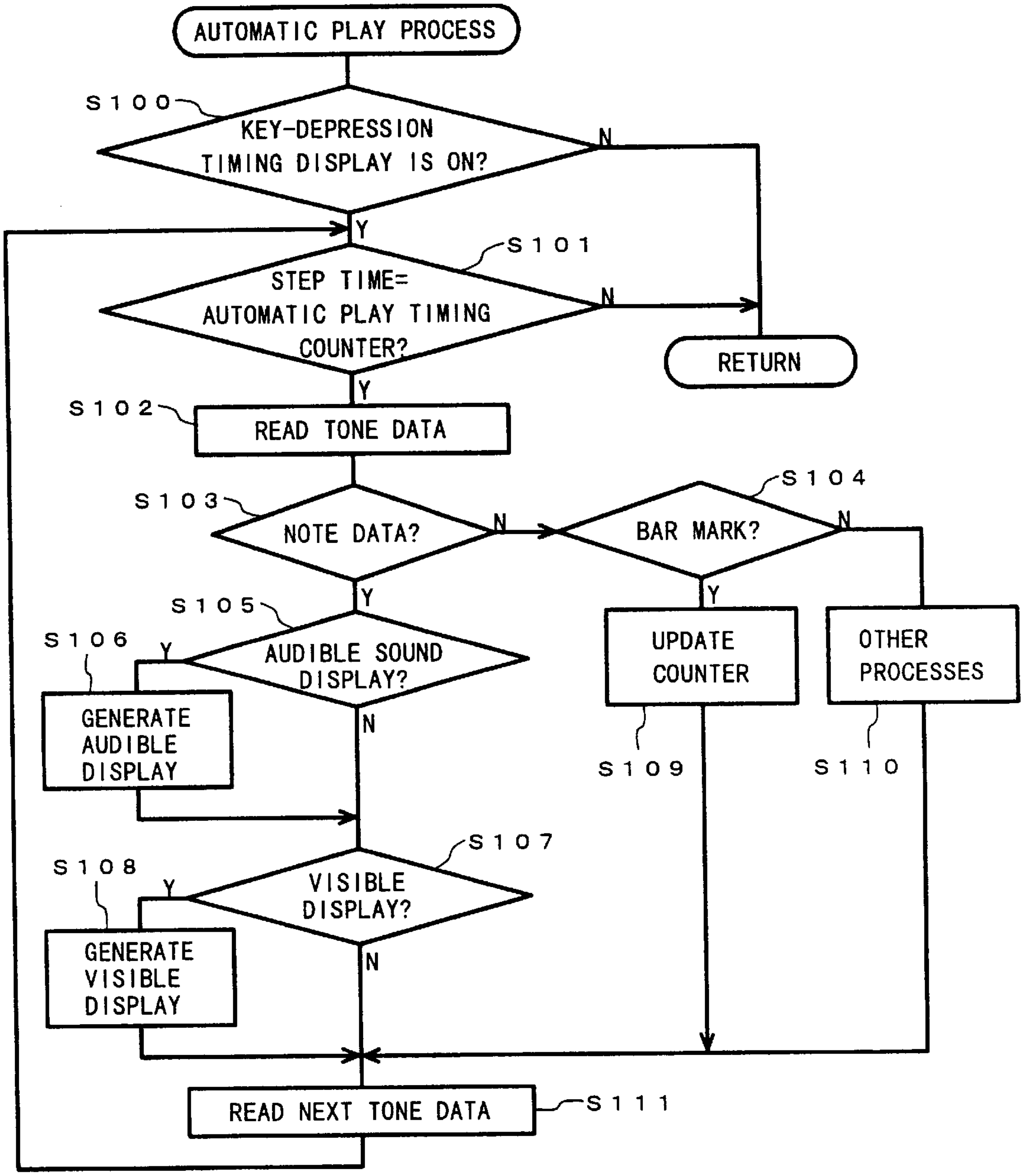
FIG. 9 is a flowchart showing an automatic play process in the second embodiment.

FIG. 9 is a flowchart showing a procedure of n automatic play in the semi-automatic play mode, where the timing for key depression is indicated to a player corresponding to a tone generation timing data or step time contained in the tone information of playing data. This process is carried out in the automatic play mode by the main flow (Step S6 in FIG. 2). However, the musical tone generation process in the Steps S6 and S14 will be disabled when the semi-automatic play mode is selected.

The musical tone generation process is not a gist of the present invention and any of known conventional processes is easily adopted for that purpose, therefore, the description on the musical tone generation process in the automatic play mode is omitted here for simplification of the specification.

At Step S100, it is examined whether a key-depression timing display mode is selected or not on the basis of judgement on whether or not the semi-automatic play mode is enabled. When yes, that is, the semi-automatic play mode is enabled, the procedure goes to Step S101. It is examined at Step S101 whether or not the step time in the automatic playing data coincides with the count of an automatic play timing counter which is provided in addition to the read timing counter for counting the number of steps from the bar mark for the semi-automatic playing. If not, the procedure is terminated, while when yes, it advances to Step S102. The automatic play timing counter comprises a bar counter for counting the number of steps in a bar and a step counter for measuring the timing in a measure or bar from the bar bark.

At Step S102, tone information is read out from the playing data. It is examined at Step S103 whether or not the read tone information is a note data, that is, tone generation command data. When yes, the procedure goes to Step S105, while when the result is negative, the procedure goes to Step S104 where it is further examined whether the tone generation is a bar mark data or not. When so, the procedure moves to Step S109 for updating the count of the automatic play timing counter. When the bar mark data is received, both the counters of the automatic play timing counter are reset to zero. When no is given at Step S104, the procedure goes to Step S110 for carrying out other processes such as tone parameter change or renewal.

It is then examined at Step S105 whether or not an audible sound display is to be made for indicating the timing for a key depression or a musical tone generation, on the basis of setting by the player through the panel circuit 5. When yes at Step S105, the procedure goes to Step S106 for carrying out the tone generation for the audible sound display. Since this display is to notify the player of the timing for a key depression or a musical tone generation, the sound display is preferably made with parameters which are different from the parameters of musical tone in tone color, volume, sound duration, etc. For example, the parameters for sound indication display is set so that the tone color is like a metronome sound, and the volume is smaller and the sound duration is shorter comparing with those for musical tones.

At Step S107 it is determined whether a visible display mode has been set or not by the player, for indicating the timing for a key depression or a musical tone generation. When yes, the procedure goes to Step S108 for performing a visible display of a short period. The display means **5*b* for visible display of the key-depression timing may be used in common with other kinds of display or may be a separate LED for exclusive use. This is followed by Step S111 for updating the read address for playing data to read a succeeding tone information and the procedure returns to Step S101**.

The display of the tone generation timing is not limited to the audible and/or visible display but may be implemented by other stimulus such as vibration. The display with vibration may permit disabled persons to enjoy the semi-automatic play.

Figure 10:
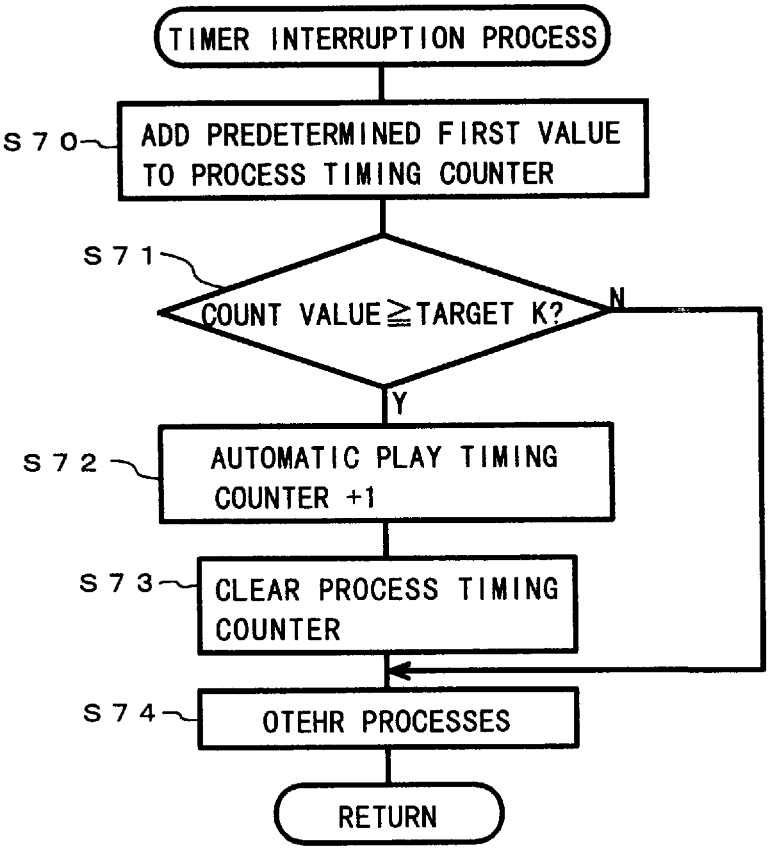
FIG. 10 is a flowchart showing a procedure of timer interruption in the second embodiment.

FIG. 10 is a flowchart showing a procedure of timer interruption. This process is triggered by timer interruption generated periodically by the hardware timer in the CPU 1. At Step S70, a process timing counter is added by a predetermined first value corresponding to a tempo to be used. It is then determined at Step S71 whether or not the counter reads more than the predetermined target value K. When yes, the procedure goes to Step S72 where the automatic play timing counter is added by "one", and in next step S73, the process timing counter is cleared. Step S74 follows where other processes such as software timer updating are carried out.

Accordingly, the semi-automatic play for carrying out the tone generation timed by key depression is executed while the key-depression timing directed by the automatic play processing is displayed. As the key-depression display assists the semi-automatic play, any uncertain segment of melody may be successfully played in the semi-automatic play mode.

The second embodiment of the present invention may also be modified as follows. According to the second embodiment, the key-depression timing display using the automatic playing function starts immediately after the settings on the panel are determined by the player. When the semi-automatic play mode has been selected, the key-depression timing display mode is no sooner turned on by the player than the key-depression timing will appear on the display. This operation requires the player to start the action of key depression just after manually switching on relevant controls in the panel circuit 5 and may hence prevent the player from starting the semi-automatic playing of the player's own initiative.

It may be arranged that when the key-depression timing display mode is selected by operating the panel circuit 5, the initial value of the automatic play timing counter is set at the timing data of the first tone information of playing data and then, the automatic playing is enabled (to start) by the first key depression of the player. This allows the key-depression timing display to start in immediate response to the first key-depression conducted at desired timing by the player.

Although the audible display is in the tone of a metronome, the metronome may be accompanied with a second tone of sound indicative of pitch. The second sound may be a particular tone, e.g., an electronic buzzer sound, which is distinguishable from an audible sign indicative of the key depression timing.

While the above-mentioned embodiments of the present invention are in the form of electronic pianos, the present invention may be applicable to any other electronic musical instruments, in particular, to the electronic keyboard instruments.

The present invention allows the automatic playing to, when the key depression is paused, for example, due to a lapse of memory, at an intermediate part of a piece in the semi-automatic play mode, automatically starting the automatic playing of the piece from the intermediate part, or an earlier than the intermediate part after a predetermined period of time has elapsed. Accordingly, the player can listen to and follow the intermediate part of the piece without conducting any extra action. If a key depression is made during the automatic playing in the semi-automatic play mode, the playing is automatically shifted back to the semi-automatic play mode. The key depression upon the memory coming back can return the mode to the semi-automatic play, thus increasing the efficiency of training for the player.

Even an unknown piece may be played in the semi-automatic play mode with help of the key-depression timing display according to the present invention. The key-depression timing display mode according to the present invention may be applied to the electronic piano of the first embodiment which is selectively switched between semi-automatic play mode and automatic play mode.

What is claimed is:

1. An electronic musical instrument for being selectively switched between automatic playing, for carrying out musical tone generation according to timing information and tone information contained in a playing data, and semi-automatic playing for carrying out musical tone generation according to the tone information, in response to key depression of a player, comprising:

key means for entering timing commands for tone generation;

key-depression detecting means for detecting the operation of the key means to produce a key-depression signal;

semi-automatic play timing controlling means responsive to the key-depression signal for controlling a first timing for tone generation in the semi-automatic playing;

automatic play timing controlling means responsive to the timing information for controlling a second timing for tone generation in the automatic playing;

pause detecting means for monitoring the key-depression signal in the semi-automatic playing, and when the key-depression signal is not issued for a first predetermined period of time, producing a semi-automatic playing pause signal;

play mode switching means responsive to the semi-automatic playing pause signal produced in the semi-automatic playing for switching from the semi-automatic playing to the automatic playing; and a tone generating means responsive to a selected one of the semi-automatic play and the automatic playing for performing the tone generation according to a pitch information contained in the playing data at one of the first and the second tone generation timings.

2. An electronic musical instrument according to claim 1, further comprising a key-depression timing displaying means for producing a stimulation indicative of timing for key depression at the second tone generation timing controlled by the automatic play timing controlling means in the semi-automatic playing.

3. An electronic musical instrument according to claim 1, wherein the stimulation is at least one of a visible display, an audible sound and a mechanical vibration.

4. An electronic musical instrument according to claim 1, wherein the automatic playing upon being switched from the semi-automatic playing starts from a paused part of the playing data where the semi-automatic playing was paused.

5. An electronic musical instrument according to claim 1, wherein the automatic playing upon being switched from the semi-automatic playing starts from a part of the playing data which is earlier than an instant when the semi-automatic playing was paused.

6. An electronic musical instrument according to claim 1, wherein the automatic playing upon being switched from the semi-automatic playing starts from the front of the playing data for a piece to be played.

7. An electronic musical instrument according to claim 1, wherein the play mode switching means is responsive to the key-depression signal which is issued in the automatic playing that has been switched from the semi-automatic playing for switching back the automatic playing to the semi-automatic playing.

8. An electronic musical instrument according to claim 1, wherein further comprising:

an automatic play request counter for updating its count value at intervals of a predetermined period in the automatic playing which has been switched from the semi-automatic playing;

a read timing counter responsive to the key-depression signal in the semi-automatic playing for updating its count until it coincides with a step time contained in the succeeding tone information;

a read timing counter updating means for adding a count, which corresponds to a time elapsed after a preceding key depression and calculated on the basis of the count of the automatic play request counter, to the count of the read timing counter; and said tone generating means producing a musical sound when the count of the read timing counter coincides with the step time.

9. An electronic musical instrument according to claim 1, wherein the first predetermined period of time for detecting the pause in the playing is a time elapsed after an immediately preceding generation of the key-depression signal.

10. An electronic musical instrument according to claim 9, wherein the first predetermined period of time is adjustable.

11. An electronic musical instrument according to claim 9, wherein the first predetermined period of time is a sum of a time from generation of the preceding key-depression signal to the succeeding key-depression defined by the playing data and a second predetermined time.

12. An electronic musical instrument for being selectively switched between automatic playing, for carrying out musical tone generation according to timing information and tone information contained in a playing data, and semi-automatic playing, for carrying out musical tone generation according to the tone information, in response to key depression of a player, comprising:

key means for entering timing commands for tone generation;

key-depression detecting means for detecting the operation of the key means to produce a key-depression signal;

semi-automatic play timing controlling means responsive to the key-depression signal for controlling a first timing for tone generation in the semi-automatic playing;

automatic play timing controlling means responsive to the timing information for controlling a second timing for tone generation in the automatic playing; and key-depression timing display means for generating a stimulation indicative of the timing for key depression in the semi-automatic playing, at the second tone generation timing controlled by the automatic play timing controlling means.

13. An electronic musical instrument according to claim 12, further comprising a tone generating means responsive to a selected one of the semi-automatic play and the automatic playing for performing the tone generation according to a pitch information contained in the playing data at one of the first and the second tone generation timings.

14. An electronic musical instrument according to claim 12, wherein the stimulation is at least one of a visible display, an audible sound and a mechanical vibraton.

15. An electronic musical instrument according to claim 12, wherein the key-depression timing displaying means includes an automatic play timing counter updated at intervals of a predetermined period corresponding to a tempo of a piece of music to be played, an initial count of said automatic play timing counter being preset at a timing information of the first tone information of the playing data for the piece of music, then being caused to be updated in response to a first key-depression signal in the semi-automatic play, whereby the stimulation is produced each time the count of the automatic play timing counter coincides with successive timing information in the playing data.

16. An electronic musical instrument for being selectively switched between automatic playing, for carrying out musical tone generation according to timing information and tone information contained in a playing data, and semi-automatic playing for carrying out musical tone generation according to the tone information, in response to key depression of a player, comprising:

at least one key for entering timing commands for tone generation;

a key-depression detector for detecting the operation of the at least one key to produce a key-depression signal;

a semi-automatic play timing controller responsive to the key-depression signal for controlling a first timing for tone generation in the semi-automatic playing;

an automatic play timing controller responsive to the timing information for controlling a second timing for tone generation in the automatic playing;

a pause detector for monitoring the key-depression signal in the semi-automatic playing, and when the key-depression signal is not issued for a first predetermined period of time, producing a semi-automatic playing pause signal;

a play mode switcher responsive to the semi-automatic playing pause signal produced in the semi-automatic playing for switching from the semi-automatic playing to the automatic playing; and a tone generator responsive to a selected one of the semi-automatic play and the automatic playing for performing the tone generation according to a pitch information contained in the playing data at one of the first and the second tone generation timings.

17. An electronic musical instrument according to claim 16 further comprising a key-depression timing display for generating a stimulation indicative of the timing for key depression in the semi-automatic playing, at the second tone generation timing controlled by the automatic play timing controller.

18. An electronic musical instrument according to claim 16 wherein the automatic playing upon being switched from the semi-automatic playing starts from a part of the playing data which is earlier than an instant when the semi-automatic playing was paused.

19. An electronic musical instrument for being selectively switched between automatic playing, for carrying out musical tone generation according to timing information and tone information contained in a playing data, and semi-automatic playing, for carrying out musical tone generation according to the tone information, in response to key depression of a player, comprising:

at least one key for entering timing commands for tone generation;

a key-depression detector for detecting the operation of the at least one key to produce a key-depression signal;

a semi-automatic play timing controller responsive to the key-depression signal for controlling a first timing for tone generation in the semi-automatic playing;

an automatic play timing controller responsive to the timing information for controlling a second timing for tone generation in the automatic playing; and a key-depression timing display for generating a stimulation indicative of the timing for key depression in the semi-automatic playing, at the second tone generation timing controlled by the automatic play timing controller.

* * * * *